Figure 1:
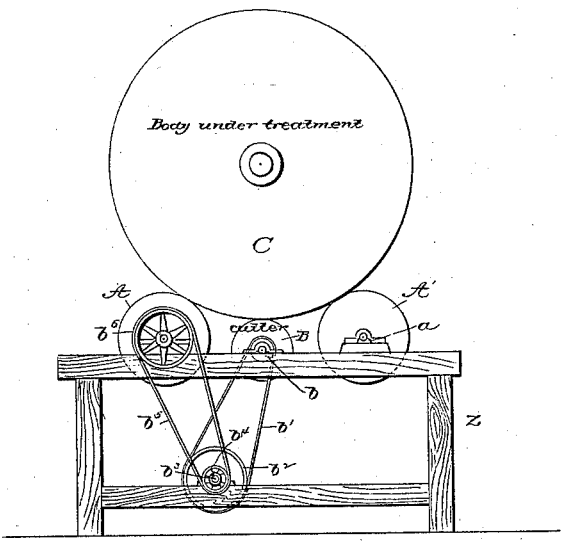

(No Model.) 2 Sheets—Sheet 1.

J. N. BARR.
MACHINE FOR PRODUCING CIRCULAR BODIES.

No. 421,374. Patented Feb. 18, 1890.

Witnesses
William W. Mortimer
F. Stanly Edmon

Inventor
J. N. Barr
By his Attorney.
Phil. T. Dodge (No Model.) 2 Sheets—Sheet 2.

J. N. BARR.
MACHINE FOR PRODUCING CIRCULAR BODIES.

No. 421,374. Patented Feb. 18, 1890.

Witnesses
N. W. Mortimer
F. Stanley Elmore

Inventor
J. N. Barr
By his Attorneys
Phil T. Dodge

N. PETERS, Photo-Lithographer, Washington, D. C.

UNITED STATES PATENT OFFICE.

JACOB N. BARR, OF MILWAUKEE, WISCONSIN.

MACHINE FOR PRODUCING CIRCULAR BODIES.

SPECIFICATION forming part of Letters Patent No. 421,374, dated February 18, 1890.

Application filed March 11, 1889. Serial No. 302,769. (No model.)

*To all whom it may concern:*

Be it known that I, JACOB N. BARR, a citizen of the United States, residing at Milwaukee, in the county of Milwaukee and State of Wisconsin, have invented certain new and useful Improvements in Machines for Producing Circular Bodies, of which the following is a full, clear, and exact specification, reference being had to the accompanying drawings, forming a part hereof.

My invention relates to the production of bodies of circular form in cross-section, whether cylindrical, conical, or spherical, the aim being to produce mechanism by which the bodies may be reduced to the required shape and size automatically without the necessity of chucking or centering them, as is necessary when such bodies are to be produced in lathes, milling-machines, or grinders of ordinary construction.

My invention is based on the fact that a circle of a certain diameter, and no other, will pass through three points in a given relation to each other. In my machine for producing cylindrical bodies two of these points are represented by fixed rollers or other supports on which the circumference of the body to be formed may revolve, while the third is represented by a fixed cutting or abrading tool or device. The cutting or abrading device may be a rotary grinding-wheel of metal or other appropriate material, or a stationary cutter similar to a lathe-tool, or a toothed rotary cutter, such as is commonly employed in milling-machines. The cutter may be located between the two supports, and this arrangement is preferred when a cylindrical surface is to be produced on the outside of the object. In some cases it may be advantageous to locate the cutter outside instead of between the supports, and where the cylindrical surface is to be formed on the inside of the body this arrangement is necessary. For the production of spherical surfaces I provide three supports at equal distances from each other and from a central cutting-tool.

The construction of the supports and the tool and the mechanism for driving the same are not of the essence of my invention, but may be modified as the skill of the mechanic may suggest in the light of the information herein given.

I have illustrated in the drawings such details only as are necessary to an understanding of my invention.

Figure 2:
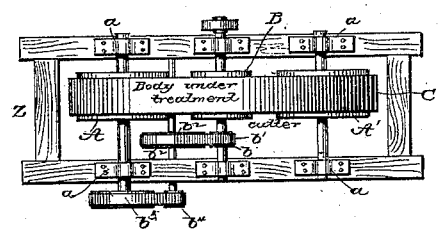
Figure 3:
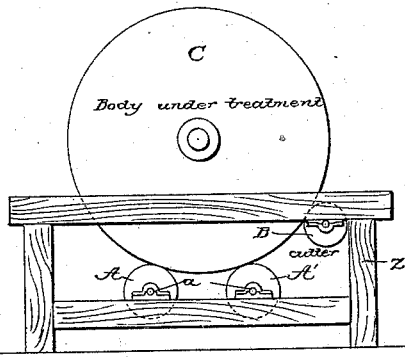
Figure 4:
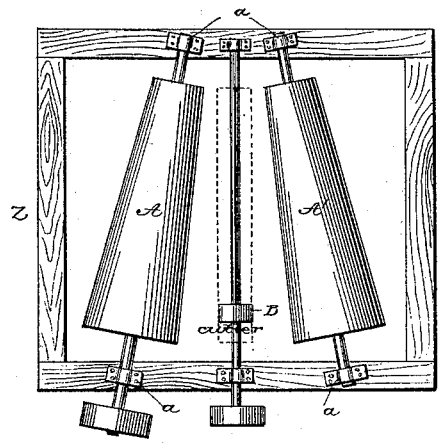
Figure 5:
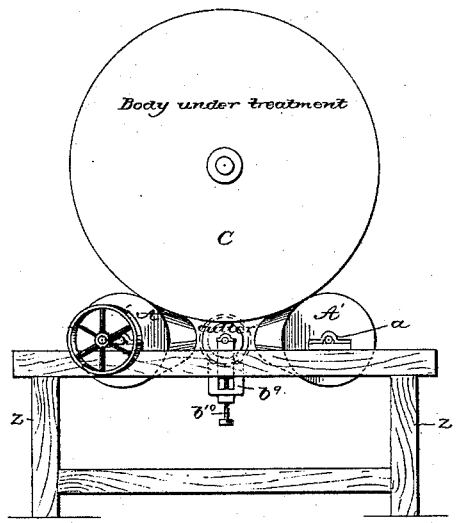
Figure 6:
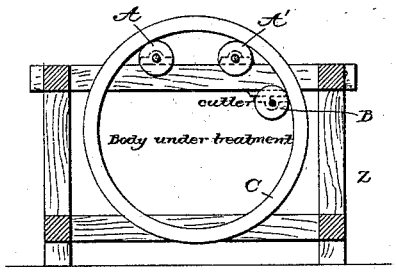
Figure 7:
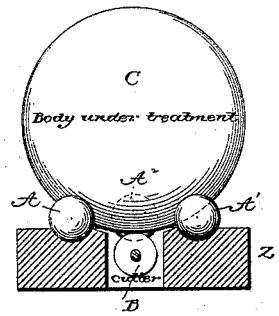
Figure 8:
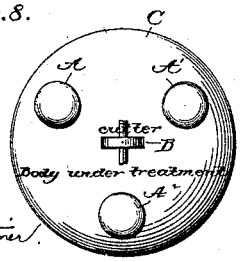

In the accompanying drawings, Figure 1 is a side elevation of an apparatus for producing an external cylindrical surface, the body under treatment being shown in position. Fig. 2 is a top plan view of the same. Fig. 3 is a side elevation showing the cutter outside of instead of between the supports. Fig. 4 is a plan view of a machine adapted for the formation of conical surfaces. Fig. 5 is an end view of the same. Fig. 6 is a side elevation showing a machine adapted for the formation of internal cylindrical surfaces. Fig. 7 is a side view of the same, adapted for the production of spherical surfaces. Fig. 8 is a plan view of the parts represented in the preceding figure.

Referring to the drawings, A A' represents two horizontal supporting-rolls mounted in bearings or supports $a$ of any suitable character on a main frame Z. The form and construction of this frame are not of the essence of my invention, the only requirement being that it shall give rigid support to the rollers and the cutter herein described.

In Figs. 1 and 2, B represents the cutting device, which is in the form of a grinding or abrading tool on a horizontal shaft, which is mounted in bearings on the main frame, so that it is sustained firmly in position. The cutter-shaft will receive a constant and rapid rotary motion by means of belts and pulleys or other appliances such as are familiar to the skilled mechanic. In the drawings the cutter-shaft is provided with a pulley $b$, driven by a belt $b'$ from a pulley $b^2$. This pulley has its driving-shaft $b^3$ mounted in bearings on the frame and provided with a driving-pulley $b^4$, which is in turn connected by belt $b^5$ to a larger pulley $b^6$ on the shaft of the supporting-roll A. By this arrangement the supporting-roll is given a relatively slow speed. The upper surface of the rolls and the upper surface of the cutter are located in such relation to each other that they will simultaneously touch the periphery of a cylinder of the required size.

C represents the body to be reduced to a cylindrical form. In its rough or unfinished condition, approximating the size and form required, it is placed upon and sustained by the rolls A A', and loosely revolved thereon, subject to the action of the cutter. Owing to the relation of the cutter to the supports, it will act upon the surface of the revolving body C, and gradually reduce the same until it acquires a circular shape in cross-section and the precise diameter for which the machine was previously adjusted. Any projection on the body beyond the required diameter or any decrease in the radius of curvature in its outer surface will cause the cutter to act where such irregularities occur. Any depression in the surface or increase in the radius of curvature of the body will prevent the cutter from acting on such portions. It is only when the circumference of the body is an exact circle and of a predetermined size that the cutter will remain constantly and uniformly in contact therewith. During the operation of the machine the axis of the body is free to change position in accordance with variations in the curvature of the portions passing over the supports. It is only when the circumference becomes a true circle that the axis of rotation of the body becomes fixed. The size of the body produced depends on the position of the upper edge of the cutter in relation to the upper edges of the supports. The higher the cutter the larger the diameter of the body produced.

In Fig. 3, A and A' represent rolls to support the body under treatment, and B the rotary cutter. These parts rotate upon horizontal shafts mounted in fixed bearings on a supporting-frame Z. In this form of machine the cutter B is located at the outer side of one of the supports instead of being located between them. The body to be reduced (represented at C) is mounted upon and sustained by rollers, as in the previous machine, and being revolved around its own axis upon the supports its surface is acted upon by the cutting-wheel and gradually reduced to a true circular form.

Figs. 4 and 5 represent a machine for producing cones. In this machine A A' represent the supporting-rolls made of conical form, their shafts being arranged horizontally in converging lines and supported in bearings on the frame Z. The bearing at each end of the cutter-shaft will be mounted, as shown in Fig. 5, to rise and fall in a guide $b^9$, and adjusted by means of a screw $b^{10}$, or equivalent adjusting devices, that it may be raised or lowered in order to change its relation to the supporting-rolls, and thus adapt the machine for the production of bodies of different diameters. A rotary cutting or grinding wheel B is mounted on a horizontal shaft $b^7$, adapted to slide endwise through bearings on the main frame. It is located between the supporting-rolls and in suitable position to act upon a conical body resting on the rolls. The body is revolved on its own axis and the cutter rotated and moved in the direction of its axis. Being thus actuated, the cutter gradually reduces the rotary body to a true conical form.

Fig. 6 represents in side elevation a machine for producing an internal cylindrical surface. A and A' represent the supporting-rolls turning on horizontal shafts or axes, mounted in a rigid supporting-frame Z. B is the rotary grinding or cutting tool mounted outside of the supporting-rolls at the side of roll A'. Its shaft or spindle is sustained in bearings on the main frame, and will receive motion from any suitable source. C represents the cylinder or ring to be finished on its interior surface. When introduced to the machine, its internal diameter is less than that demanded. It is sustained by and revolved around the rollers A A', either by hand or otherwise. Being thus supported and guided, it is acted upon by the cutter until it acquires a true circular form and the predetermined diameter internally. When this condition is reached, further action of the cutter becomes impossible.

Figs. 7 and 8 represent a machine for producing spherical bodies. A, A', and $A^2$ represent three supporting rolls or balls seated in a rigid base-frame Z at the angles of an ordinary equilateral triangle. B represents an ordinary cutting-wheel located at a central point below the upper surface of the supports. The body to be reduced, of approximately-spherical form, is placed upon the three supports and revolved thereon in different directions, subject to the action of the cutter, which will finally reduce it to the form of a true sphere, the diameter of which will depend upon the extent to which the cutter is depressed below the supports. The principle governing the action of this machine is the same as that governing the other constructions shown.

In order to adapt the machine in each of its forms for the production of bodies of different diameters, it is only necessary to provide for changing the relation of the cutter to the supports, of the supports to the cutter, or the one support to the other support and the cutter. One method of doing this is illustrated in Fig. 5.

It will be manifest to the skilled mechanic that any equivalent means of adjustment, many of which are known in the art, may be employed.

In each form of my apparatus the body to be reduced may rest freely upon the supports, in which case reliance should be placed upon the weight of the body to secure contact with the cutter; but, if desired, pressure devices of any suitable character may be employed to urge the body forward. These pressure devices are no part of the present invention.

What I claim is—

1. In a machine for reducing bodies to a circular form in cross-section, the combination, substantially as described and shown, of a frame provided with two rollers or like supports for the periphery of the body to be reduced, and a cutter fixed in such relation to said supports that a circle of the required size will touch the active points of the cutter and the supports, whereby a body sustained and revolved on the supports will be automatically reduced by the cutter to a true circular form and to the predetermined diameter.

2. In a machine for giving solid bodies a circular form in cross-section, the combination, with a suitable frame, of two rollers, and an intermediate rotary cutter, all fixed in position and arranged to act on the circumference of the body to be reduced, substantially as described and shown.

3. In a machine for giving bodies a circular form in cross-section, the combination of a suitable frame, two rollers fixed therein at a distance from each other to give peripheral support to the body to be reduced, an adjacent cutter to act on the periphery of the body, and adjustable supports for changing and fixing the relation of the cutter to the rolls.

In testimony whereof I hereunto set my hand, this 11th day of February, 1889, in the presence of two attesting witnesses.

JACOB N. BARR.

Witnesses:
H. H. FIELD,
G. E. WEISS.